(12) United States Patent
Ito et al.

(10) Patent No.: US 11,549,031 B2
(45) Date of Patent: Jan. 10, 2023

(54) COATING MATERIAL FOR FORMING MATTE HARD COAT, AND DECORATIVE SHEET USING SAME

(71) Applicant: RIKEN TECHNOS CORPORATION, Tokyo (JP)

(72) Inventors: Shigekazu Ito, Tokyo (JP); Koji Inagaki, Tokyo (JP)

(73) Assignee: RIKEN TECHNOS CORPORATION

( * ) Notice: Subject to any disclaimer, the term of this patent is extended or adjusted under 35 U.S.C. 154(b) by 0 days.

(21) Appl. No.: 16/345,590

(22) PCT Filed: Oct. 17, 2017

(86) PCT No.: PCT/JP2017/037559
§ 371 (c)(1),
(2) Date: Apr. 26, 2019

(87) PCT Pub. No.: WO2018/079346
PCT Pub. Date: May 3, 2018

(65) Prior Publication Data
US 2019/0264060 A1    Aug. 29, 2019

(30) Foreign Application Priority Data

Oct. 28, 2016  (JP) .............................. JP2016-211349

(51) Int. Cl.

| | | |
|---|---|---|
| *C09D 133/14* | (2006.01) | |
| *C09D 7/40* | (2018.01) | |
| *C09D 7/62* | (2018.01) | |
| *C09D 133/04* | (2006.01) | |
| *C09D 175/04* | (2006.01) | |
| *B32B 27/30* | (2006.01) | |
| *B32B 38/18* | (2006.01) | |
| *B32B 27/00* | (2006.01) | |
| *C08G 18/67* | (2006.01) | |

(52) U.S. Cl.
CPC ............ *C09D 133/14* (2013.01); *B32B 27/00* (2013.01); *B32B 27/30* (2013.01); *B32B 38/18* (2013.01); *C08G 18/673* (2013.01); *C08G 18/6715* (2013.01); *C09D 7/40* (2018.01); *C09D 7/62* (2018.01); *C09D 7/67* (2018.01); *C09D 7/69* (2018.01); *C09D 133/04* (2013.01); *C09D 175/04* (2013.01)

(58) Field of Classification Search
CPC .... C08K 2003/2203–2206; C08K 3/22; C08K 3/2279; C09D 133/04; C09D 7/67; C09D 175/04; C09D 7/69; C09D 133/06–16; C09D 133/24–26; C08G 18/671–673
See application file for complete search history.

(56) References Cited

U.S. PATENT DOCUMENTS

| | | | | |
|---|---|---|---|---|
| 4,380,604 A | * | 4/1983 | Neuhaus ............... | G03F 7/0388 524/873 |
| 2001/0038910 A1 | * | 11/2001 | MacQueen .............. | C08J 3/244 428/327 |
| 2004/0156110 A1 | | 8/2004 | Ikeyama | |
| 2005/0249939 A1 | * | 11/2005 | Barkac ..................... | C09D 7/61 428/323 |
| 2015/0148443 A1 | * | 5/2015 | Kang ....................... | C09D 7/48 522/64 |

FOREIGN PATENT DOCUMENTS

| | | | |
|---|---|---|---|
| CN | 101166798 A | | 4/2008 |
| CN | 104520387 A | | 4/2015 |
| JP | 50 59497 A | * | 5/1975 |
| JP | S5951920 A | | 3/1984 |
| JP | S5951952 A | | 3/1984 |
| JP | 2002363483 A | | 12/2002 |
| JP | 2012091487 A | | 5/2012 |
| JP | 2013031995 A | | 2/2013 |
| JP | 2013064098 A | | 4/2013 |
| JP | 2013202894 A | | 10/2013 |
| JP | 5954556 B2 | | 7/2016 |

OTHER PUBLICATIONS

Machine Translation of JPS50-59497A. May 22, 1975 (Year: 1975).*
Resoution Performance Products. Epikote Resin 828 Product Data Sheet. Sep. 2002. (Year: 2002).*

(Continued)

*Primary Examiner* — Stephen E Rieth
(74) *Attorney, Agent, or Firm* — Bracewell LLP; Brad Y. Chin

(57) ABSTRACT

Embodiments provide a coating material including (A) 100 parts by mass of an active-energy-ray-curable resin, (B) 5 to 200 parts by mass of aluminum oxide particles having an average particle diameter of 1 to 100 μm, (C) 0.1 to 20 parts by mass of aluminum oxide microparticles having an average particle diameter of 1 to 100 nm, and (D) 0.1 to 40 parts by mass of a compound having at least two isocyanate groups per molecule, where the active-energy-ray-curable resin (A) includes (a1) 70 to 99% by mass of a polyfunctional (meth)acrylate and (a2) 30 to 1% by mass of an acrylamide compound having at least one hydroxyl group per molecule, and the sum total of the amount of the polyfunctional (meth)acrylate (a1) and the amount of the acrylamide compound (a2) having at least one hydroxyl group per molecule is 100% by mass.

6 Claims, 1 Drawing Sheet

(56) References Cited

OTHER PUBLICATIONS

Bauer et al. Nano/Micro Particle Hybrid Composites for Scratch and Abrasion Resistant Polyacrylate Coatings. Macromol. Mater. Eng. 2006, 291, 493-498. (Year: 2006).*

Cayton, R. H. Nanocrystalline Alumina in Transparent UV Coatings. UV & EB 2004 Technology Expo & Conference, May 2-5, 2004, Charlotte Convention Center, Charlotte, NC, USA, technical conference proceedings (Year: 2004).*

EP17864392.0 Supplementary Search Report dated Feb. 21, 2020; 10 pgs.

PCT/JP2017/037559 International Search Report dated Jan. 12, 2018; 2 pgs.

EP17864392.0 First Office Action dated Jan. 14, 2021, 9 pgs.

CN201780066491.1 First Office Action dated Oct. 13, 2020, 16 pgs.

Bauer, et al., Nano/Micro Particle Hybrid Composites for Scratch and Abrasion Resistant Polyacrylate Coatings, Macromolecular Materials and Engineering, Wiley VCH Verlag, Weinheim, DE, vol. 291, No. 5, May 23, 2006, pp. 493-498, XP002728220.

Bauer, et al., UV curing and matting of acrylate coatings reinforced by nano-silica and micro-corundum particles, Process in Organic Coatings, Elsevier BV, NL, vol. 60, No. 2, Sep. 1, 2007, pp. 121-126, XP022284406.

Cayton, Nanocrystalline Alumina in Transparent UV Coatings, Dec. 31, 2005, XP055755360, Rad Tech e5 2004 Technical Proceedings, 6 pages.

EP17864392.0 Second Office Action dated Aug. 19, 2021, 9 pages.

Sow, et al., UV-watemome polyurethane-acrylate nanocomposite coatings containing alumina and silica nanoparticles for wood: mechanical, optical, and thermal properties assessment, Journal of Coatings Technology aand Research, Vo. 8, No. 2, Oct. 2, 2014.

CN201780066491.1 Third Office Action dated Aug. 23, 2021, 26 pgs.

CN201780066491.1 Second Office Action dated Apr. 19, 2021, 17 pgs.

EP17864392.0 Third Examination Report dated Mar. 30, 2022, 10 pgs.

Ozcan-Taskin, et al., Effect of Particle Type on The Mechanisma of Break Up of Nanoscale Perticle Clusters, 13th European Conference on Mixing, London, Apr. 14-17, 2009, 9 pgs.

\* cited by examiner

COATING MATERIAL FOR FORMING MATTE HARD COAT, AND DECORATIVE SHEET USING SAME

CROSS REFERENCE TO RELATED APPLICATIONS

This application claims the benefit of and priority to PCT/JP2017/037559, filed on Oct. 17, 2017, entitled (translation). "COATING MATERIAL FOR FORMING MATTE HARD COAT AND DECORATIVE SHEET USING SAME." which claims the benefit of and priority to Japanese Patent Application No. 2016-211349, filed on Oct. 28, 2016, which are hereby incorporated by reference in their entirety into this application.

BACKGROUND

Embodiments relate to a coating material. More specifically, embodiments relate to a coating material which can form a hard coat giving a matte design (hereinafter may be referred to as "matte hard coat" in some cases) and a decorative sheet using the same.

DESCRIPTION OF THE RELATED ART

Conventionally, as household electric appliances such as refrigerators, washing machines, air conditioners, mobile phones and personal computers; furniture such as decorating shelves, storage chest of drawers, dish cupboards and desks; or building members such as floors, walls and bathrooms; ornamental decorated products obtained by laminating a decorative sheet on a surface of a substrate formed of a wood-based material such as wood, plywood, laminated wood, particle board and hard board; a substrate formed of a resin-based material such as polystyrene, acrylonitrile-butadiene-styrene copolymer resin (ABS resin), polycarbonate and polyester, or a substrate formed of a metallic material such as iron and aluminum have been used. Recently, as a differentiation point of products, its design has become increasingly important. Therefore, it has been proposed to form a hard coat on a surface layer of a decorative sheet using a coating material containing a matting agent, thereby imparting a matte design to the decorative sheet (see, for example, PATENT LITERATURES 1 and 2). However, these techniques have disadvantages that scratch resistance is insufficient; and the matting agent may sediment over time at the bottom of a coating material pan during coating and the matte design of the decorative sheet obtained cannot be stabilized.

CITATION LIST

Patent Literature

PATENT LITERATURE 1: JP-A-2012-091487
PATENT LITERATURE 2: JP-A-2013-031995

SUMMARY

An object of the various embodiments of the subject application is to provide a coating material which can form a matte hard coat. A further object of the various embodiments of the subject application is to provide a coating material, which is excellent in scratch resistance (at least Taber abrasion resistance), crack resistance and bending resistance and can form a hard coat giving a stable matte design.

The "crack resistance" usually represents a measure of durability against cracks at the time of bending, so it is understood that it means substantially the same property as "flex resistance".

As a result of intensive research, the present inventors have found that the above object can be achieved by a specific coating material according to various embodiments.

According to at least one embodiment, there is provided a coating material including (A) 100 parts by mass of an active-energy-ray-curable resin; (B) 5 to 200 parts by mass of aluminum oxide particles having an average particle diameter of 1 to 100 µm; (C) 0.1 to 20 parts by mass of aluminum oxide fine particles having an average particle diameter of 1 to 100 nm; and (D) 0.1 to 40 parts by mass of a compound having at least two isocyanate groups per molecule, where the active-energy-ray-curable resin (A) includes (a1) 70% to 99% by mass of a polyfunctional (meth)acrylate and (a2) 30% to 1% by mass of an acrylamide compound having at least one hydroxyl group per molecule, and the sum total of the amount of the polyfunctional (meth)acrylate (a1) and the amount of the acrylamide compound (a2) having at least one hydroxyl group per molecule is 100% by mass.

According to at least one embodiment, the polyfunctional (meth)acrylate (a1) contains an ethanolamine-modified polyether (meth)acrylate having at least three (meth)acryloyl groups per molecule, and the active-energy-ray-curable resin (A) contains 20% to 90% by mass of the ethanolamine-modified polyether (meth)acrylate having at least three (meth)acryloyl groups per molecule, based on 100% by mass of the sum total of the amount of the polyfunctional (meth)acrylate (a1) and the amount of the acrylamide compound (a2) having at least one hydroxyl group per molecule.

According to at least one embodiment, the polyfunctional (meth)acrylate (a1) contains a polyfunctional (meth)acrylate having a bisphenol A structure, and the active-energy-ray-curable resin (A) contains 15% to 90% by mass of the polyfunctional (meth)acrylate having a bisphenol A structure, based on 100% by mass of the sum total of the amount of the polyfunctional (meth)acrylate (a1) and the amount of the acrylamide compound (a2) having at least one hydroxyl group per molecule.

According to at least one embodiment, an article containing a hard coat formed from the coating material according to various embodiments as described above.

According to at least one embodiment, there is provided a decorative sheet containing a hard coat formed from the coating material according to various embodiments as described above.

According to at least one embodiment, there is provided an article containing the decorative sheet according to various embodiments as described above.

The hard coat formed from the coating material according to various embodiments can impart a matte design. Further, this hard coat is excellent in scratch resistance (at least Taber abrasion resistance). The preferred coating material according to at least one embodiment can be stably coated, so that matting properties of the formed hard coat are stable. In addition, according to at least one embodiment, the hard coat formed from the coating material is excellent in scratch resistance, crack resistance, and bending resistance. Therefore, the coating material of according to at least one embodiment can be suitably used as a coating material for forming a hard coat which gives a matte design to a decorative sheet.

DETAILED DESCRIPTION

Figure 1:
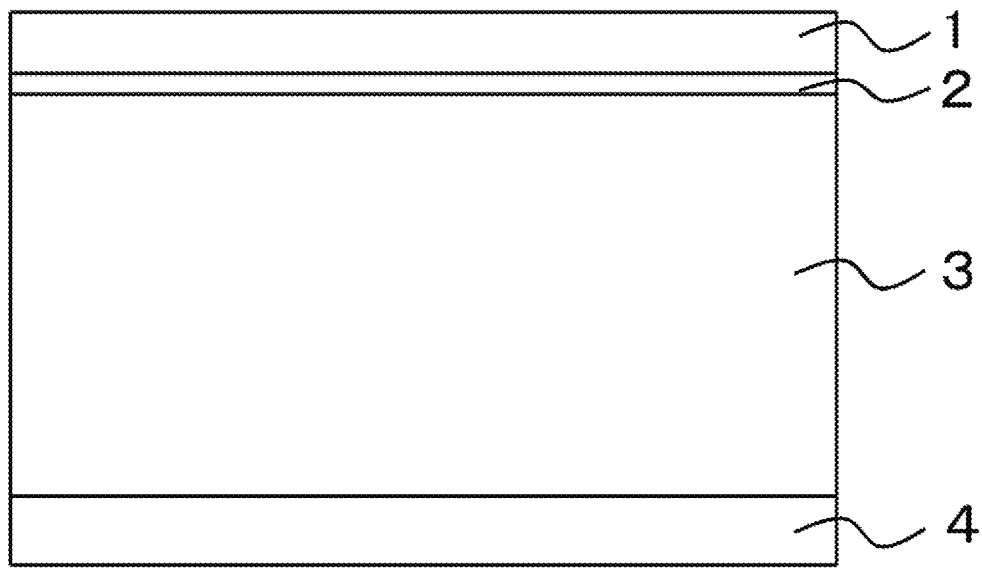
FIG. 1 is a conceptual diagram of a cross section showing an example of a decorative sheet according to an embodiment.

In the present specification, the term "film" is used as a term also including a sheet. The term "resin" is used as a term also including a resin mixture containing two or more resins and a resin composition containing a component other than resins. In addition, in this specification, sequential layering of one layer and another layer includes both that the layers are directly laminated and that the layers are laminated with one or more additional layers such as an anchor coat interposed therebetween. The term "or more" for a numerical range is used to mean a certain numerical value, or more than the certain numerical value. For example, 20% or more means 20%, or more than 20%. The term "or less" for a numerical range is used to mean a certain numerical value, or less than the certain numerical value. For example, 20% or less means 20%, or less than 20%. Further, the symbol "to" for the numerical range is used to mean a certain numerical value, more than the certain numerical value and less than other certain numerical value, or the other certain numerical value. Here, the other certain numerical value is a numerical value larger than the certain numerical value. For example, 10% to 90% means 10%, more than 10% and less than 90%, or 90%.

Except in examples, or unless otherwise specified, all numerical values used in the specification and claims are to be understood as modified by the term "about." Without intending to limit the application of the doctrine of equivalents to the scope of the claims, each numerical value should be construed in light of significant figures and by applying ordinary rounding techniques.

1. Coating Material

The coating material according to at least one embodiment contains (A) an active-energy-ray-curable resin; (B) aluminum oxide particles having an average particle diameter of 1 to 100 μm; (C) aluminum oxide fine particles having an average particle diameter of 1 to 100 nm; and (D) a compound having at least two isocyanate groups per molecule. Here, the active-energy-ray-curable resin (A) is composed of (a1) a polyfunctional (meth)acrylate and (a2) an acrylamide compound having at least one hydroxyl group per molecule. Each component will be described below.

(a1) Polyfunctional (Meth)acrylate

According to at least one embodiment, the polyfunctional (meth)acrylate (a1) is a (meth)acrylate having at least two (meth)acryloyl groups per molecule. Since this polyfunctional (meth)acrylate has at least two (meth)acryloyl groups per molecule, it is polymerized and cured by active energy rays such as ultraviolet rays and electron beams and functions to form a hard coat.

Examples of the polyfunctional (meth)acrylate include (meth)acryloyl group-containing bifunctional reactive monomers such as diethylene glycol di(meth)acrylate, neopentyl glycol di(meth)acrylate, 1,6-hexanediol di(meth)acrylate, polyethylene glycol di(meth)acrylate, 2,2'-bis(4-(meth)acryloyloxypolyethyleneoxyphenyl) propane and 2,2'-bis(4-(meth)acryloyloxypolypropyleneoxyphenyl) propane; (meth)acryloyl group-containing trifunctional reactive monomers such as trimethylolpropane tri(meth)acrylate, trimethylolethane tri(meth)acrylate and pentaerythritol tri(meth)acrylate; (meth)acryloyl group-containing tetrafunctional reactive monomers such as pentaerythritol tetra(meth)acrylate; (meth)acryloyl group-containing hexafunctional reactive monomers such as dipentaerythritol hexaacrylate; (meth)acryloyl group-containing octafunctional reactive monomers such as tripentaerythritol acrylate, and polymers (oligomers and prepolymers) containing one or more of them as constituent monomer. In the present specification, the term (meth)acrylate means acrylate or methacrylate.

According to at least one embodiment, the polyfunctional (meth)acrylate may contain an ethanolamine-modified polyether (meth)acrylate having at least three (meth)acryloyl groups per molecule. The amount of the ethanolamine-modified polyether (meth)acrylate having at least three (meth)acryloyl groups per molecule may be preferably 15% by mass or more, more preferably 20% by mass or more, further preferably 30% by mass or more, and still more preferably 40% by mass or more, based on 100% by mass of the sum total of the amount of component (a1) and the amount of component (a2) (in other words, based on 100% by mass of the active-energy-ray-curable resin (A)). By such amount, it is possible to improve crack resistance and bending resistance of the hard coat, and improve workability in decorating an article using a decorative sheet. On the other hand, the amount of the ethanolamine-modified polyether (meth)acrylate having at least three (meth)acryloyl groups per molecule may be preferably 90% by mass or less, more preferably 75% by mass or less, and further preferably 60% by mass or less, from a viewpoint of scratch resistance and surface hardness of the hard coat.

In one embodiment, the amount of the ethanolamine-modified polyether (meth)acrylate having at least three (meth)acryloyl groups per molecule may be preferably 15% by weight or more and 90% by weight or less, 15% by weight or more and 75% by weight or less, 15% by weight or more and 60% by weight or less, 20% by weight or more and 90% by weight or less, 20% by weight or more and 75% by weight or less, 20% by weight or more and 60% by weight or less, 30% by weight or more and 90% by weight or less, 30% by weight or more and 75% by weight or less, 30% by weight or more and 60% by weight or less, 40% by weight or more and 90% by weight or less, 40% by weight or more and 75% by weight or less, or 40% by weight or more and 60% by weight or less, based on 100% by mass of the sum total of the amount of component (a1) and the amount of component (a2).

As the ethanolamine-modified polyether (meth)acrylate having at least three (meth)acryloyl groups per molecule, for example, one having the following structure disclosed as component (A) of JP-A-2013-064098 can be used.

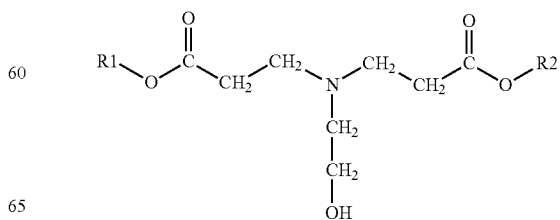

wherein R1 and R2 are each a polyether (meth)acrylate residue having at least one (meth)acryloyloxy group, and the sum of the number of (meth)acryloyloxy groups in R1 and the number of (meth)acryloyloxy groups in R2 is 3 or more. The sum of the number of (meth)acryloyloxy groups in R1 and the number of (meth)acryloyloxy groups in R2 is preferably 3 to 9, and more preferably 4. R1 and R2 may be the same as or different from each other, but it is preferable that R1 and R2 are the same.

Among the ethanolamine-modified polyether (meth)acrylate having at least three (meth)acryloyl groups per molecule having the above structure, particularly preferred compounds include compounds represented by the following chemical formula.

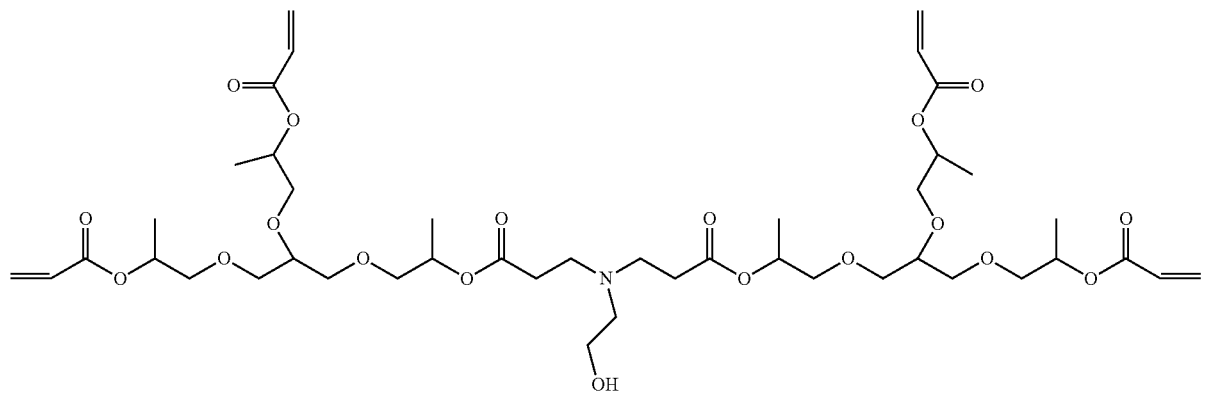 [SMILES: C=CC(=O)OC(C)COCC(COCC(C)OC(=O)CCN(CCO)CCC(=O)OC(C)COCC(COCC(C)OC(=O)C=C)OCC(C)OC(=O)C=C)OCC(C)OC(=O)C=C]

The polyfunctional (meth)acrylate may include a polyfunctional (meth)acrylate having a bisphenol A structure. The amount of the polyfunctional (meth)acrylate having a bisphenol A structure may be preferably 15% by mass or more, more preferably 25% by mass or more, and further preferably 35% by mass or more, based on 100% by mass of the sum total of the amount of component (a1) and the amount of component (a2) (in other words, based on 100% by mass of the active-energy-ray-curable resin (A)). It is possible to improve curability of the coating material and improve crack resistance and bending resistance of the hard coat. On the other hand, from a viewpoint of scratch resistance and surface hardness, the amount of the polyfunctional (meth)acrylate having a bisphenol A structure may be preferably 90% by mass or less, more preferably 80% by mass or less, and further preferably 60% by mass or less.

In one embodiment, the amount of the polyfunctional (meth)acrylate having a bisphenol A structure may be preferably 15% by mass or more and 90% by mass or less, 15% by mass or more and 80% by mass or less, 15% by mass or more and 60% by mass or less, 25% by mass or more and 90% by mass or less, 25% by mass or more and 80% by mass or less, 25% by mass or more and 60% by mass or less, 35% by mass or more and 90% by mass or less, 35% by mass or more and 80% by mass or less, or 35% by mass or more and 60% by mass or less, based on 100% by mass of the sum total of the amount of component (a1) and the amount of component (a2).

According to at least one embodiment, the polyfunctional (meth)acrylate having a bisphenol A structure is not particularly limited, but typically it may be a compound having a structure represented by the following general formula (1). In the formula, R1 and R2 are each an aliphatic alkylene chain having 1 to 20 carbon atoms in total, preferably 2 to 12 carbon atoms, and more preferably 2 to 6 carbon atoms, which may have an alkyl branch, a cyclic hydrocarbon group or an ether group; and, m and n are each independently a natural number of usually 1 or more, and preferably a natural number of 2 to 50. $R_1$ may typically be "—$CH_2$—$CH_2$—O—". $R_2$ may typically be "—O—$CH_2$—$CH_2$—". $R_1$ may typically be "—$CH_2$—$CH(CH_3)$—O—"

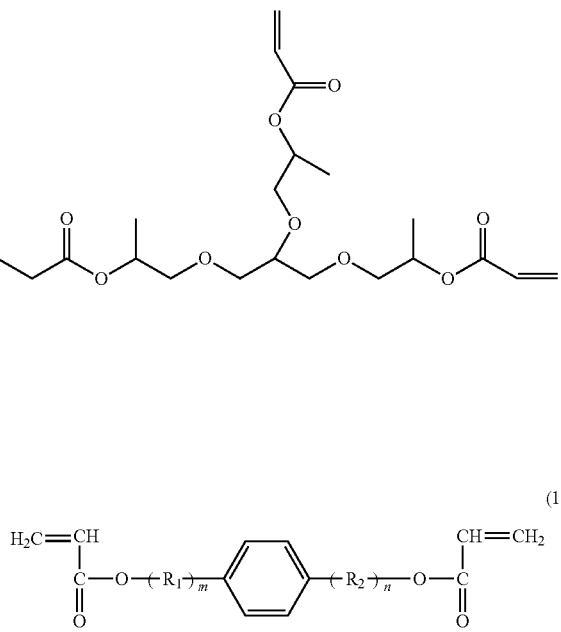

(1)

Examples of the polyfunctional (meth)acrylate having a bisphenol A structure include alkoxylated bisphenol A polyfunctional (meth)acrylates such as ethoxylated bisphenol A diacrylate and propoxylated bisphenol A diacrylate.

As component (a1), one kind or a mixture of two or more kinds of them can be used.

(a2) Acrylamide Compound Having at Least One Hydroxyl Group Per Molecule

According to at least one embodiment, the acrylamide compound (a2) having at least one hydroxyl group per molecule reacts with the compound having at least two isocyanate groups per molecule (D) to form a urethane bond, and functions to improve crack resistance and bending resistance of the hard coat.

According to at least one embodiment, the acrylamide compound (a2) having at least one hydroxyl group per molecule is not particularly limited, but typically it may be a compound having a structure represented by the following general formula (2). In the formula, R is an aliphatic alkylene chain having 1 to 20 carbon atoms in total, preferably 2 to 6 carbon atoms, and more preferably 2 to 4 carbon atoms, which may have an alkyl branch, a cyclic hydrocarbon group or an ether group. R may typically be "—$(CH_2)_x$—". Here, x may be a natural number of usually 1 or more, preferably 2 to 6, and more preferably a natural number of 2 to 4. The number of hydroxyl groups of component (a2) ("n" in the formula) may be usually 1 or 2, and preferably 1. The hydroxyl group of component (a2) may preferably be a primary hydroxyl group.

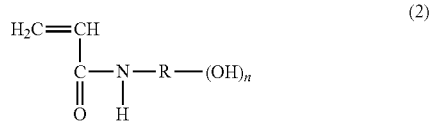

(2)

Examples of component (a2) include hydroxyethyl acrylamide, hydroxypropyl acrylamide, hydroxybutyl acrylamide, and the like.

As component (a2), one kind or a mixture of two or more kinds of them can be used.

According to at least one embodiment, the blending ratio of component (a1) and component (a2) in the active-energy-ray-curable resin (A) may be usually 70% by mass or more of component (a1) (30% by mass or less of component (a2)), and preferably 80% by mass or more of component (a1) (20% by mass or less of component (a2)), and more preferably 85% by mass or more of component (a1) (15% by mass or less of component (a2)), based on 100% by mass of the sum total of the amount of component (a1) and the amount of component (a2), from a viewpoint of scratch resistance and surface hardness. On the other hand, from a viewpoint of crack resistance and bending resistance, the blending ratio may be usually 99% by mass or less of component (a1) (1% by mass or more of component (a2)), preferably 98% by mass or less of component (a1) (2% by mass or more of component (a2)), and more preferably 96% by mass or less of component (a1) (4% by mass or more of component (a2)). In one embodiment, the blending ratio of component (a1) and component (a2) in the active-energy-ray-curable resin (A) may be usually 70% by mass or more and 99% by mass or less of component (a1) (30% by mass or less and 1% by mass or more of component (a2)), and preferably 70% by mass or more and 98% by mass or less of component (a1) (30% by mass or less and 2% by mass or more of component (a2)), 70% by mass or more and 96% by mass or less of component (a1) (30% by mass or less and 4% by mass or more of component (a2)), 80% by mass or more and 99% by mass or less of component (a1) (20% by mass or less and 1% by mass or more of component (a2)), 80% by mass or more and 98% by mass or less of component (a1) (20% by mass or less and 2% by mass or more of component (a2)), 80% by mass or more and 96% by mass or less of component (a1) (20% by mass or less and 4% by mass or more of component (a2)), 85% by mass or more and 99% by mass or less of component (a1) (15% by mass or less and 1% by mass or more of component (a2)), 85% by mass or more and 98% by mass or less of component (a1) (15% by mass or less and 2% by mass or more of component (a2)), or 85% by mass or more and 96% by mass or less of component (a1) (15% by mass or less and 4% by mass or more of component (a2)), based on 100% by mass of the sum total of the amount of component (a1) and the amount of component (a2).

(B) Aluminum Oxide Particles Having Average Particle Diameter of 1 to 100 μm

According to at least one embodiment, the aluminum oxide particles having an average particle diameter of 1 to 100 μm (B) function to improve scratch resistance and surface hardness of the hard coat. Further, the aluminum oxide particles having an average particle diameter of 1 to 100 μm (B) function to mattify the hard coat formed from the coating material according to at least one embodiment or to make the hard coat feel smoother.

It is preferable to use the aluminum oxide particles having an average particle diameter of 1 to 100 μm (B) whose surface is treated with a surface treatment agent such as a silane coupling agent such as vinylsilane or aminosilane; a titanate coupling agent; an aluminate coupling agent; an organic compound having an ethylenic unsaturated bond group such as a (meth)acryloyl group, a vinyl group or an allyl group or a reactive functional group such as an epoxy group; a fatty acid, a fatty acid metal salt, or the like. It is possible to enhance dispersibility of component (B) in the coating material or to increase surface hardness of the obtained hard coat.

According to at least one embodiment, the average particle diameter of the aluminum oxide particles having an average particle diameter of 1 to 100 μm (B) may be usually 100 μm or less, preferably 50 μm or less, and more preferably 20 μm or less, from a viewpoint of suppressing sedimentation of component (B) at the bottom of a coating material pan over time during coating. On the other hand, from a viewpoint of abrasion resistance, it may be usually 1 μm or more, preferably 3 μm or more, and more preferably 5 μm or more. In one embodiment, the average particle diameter of the aluminum oxide particles having an average particle diameter of 1 to 100 μm (B) may be usually 100 μm or less and 1 μm or more, and preferably 100 μm or less and 3 μm or more, 100 μm or less and 5 μm or more, 50 μm or less and 1 μm or more, 50 μm or less and 3 μm or more, 50 μm or less and 5 μm or more, 20 μm or less and 1 μm or more, 20 μm or less and 3 μm or more, or 20 μm or less and 5 μm or more.

According to at least one embodiment, the average particle diameter of the particles or fine particles is a particle diameter at which cumulation from a smaller side of the particle diameter becomes 50% by mass in a particle diameter distribution curve measured using a laser diffraction/scattering particle size analyzer "MT3200II" (trade name) available from Nikkiso Co., Ltd.

A laser diffraction/scattering particle size analyzer available from another supplier may be used for measuring the average particle diameter of the particles or fine particles. That is, one skilled in the art can measure the average particle diameter of the particles or fine particles, based on the above definition and by reference to common general knowledge.

According to at least one embodiment, the amount of the aluminum oxide particles having an average particle diameter of 1 to 100 μm (B) may be usually 200 parts by mass or less, preferably 150 parts by mass or less, more preferably 100 parts by mass or less, and further preferably 80 parts by mass or less, with respect to 100 parts by mass of component (A), from a viewpoint of crack resistance and bending resistance of the hard coat. On the other hand, the lower limit of the amount of the aluminum oxide particles having an average particle diameter of 1 to 100 μm (B) may be usually 5 parts by mass or more, preferably 20 parts by mass or more, more preferably 40 parts by mass or more, and more preferably 60 parts by mass or more, although it also depends on the degree of desired matting. In one embodiment, the amount of the aluminum oxide particles having an average particle diameter of 1 to 100 μm (B) may be usually 200 parts by mass or less and 5 parts by mass or more, and preferably 200 parts by mass or less and 20 parts by mass or more, 200 parts by mass or less and 40 parts by mass or more, 200 parts by mass or less and 60 parts by mass or more, 150 parts by mass or less and 5 parts by mass or more, 150 parts by mass or less and 20 parts by mass or more, 150 parts by mass or less and 40 parts by mass or more, 150 parts by mass or less and 60 parts by mass or more, 100 parts by mass or less and 5 parts by mass or more, 100 parts by mass or less and 20 parts by mass or more, 100 parts by mass or less and 40 parts by mass or more, 100 parts by mass or less and 60 parts by mass or more, 80 parts by mass or less and 5 parts by mass or more, 80 parts by mass or less and 20 parts by mass or more, 80 parts by mass or less and 40 parts by mass or more, or 80 parts by mass or less and 60 parts by mass or more, with respect to 100 parts by mass of the active-energy-ray-curable resin (A).

(C) Aluminum Oxide Fine Particles Having Average Particle Diameter of 1 to 100 nm According to at least one embodiment, the aluminum oxide fine particles having an average particle diameter of 1 to 100 nm (C) suppresses sedimentation of component (B) at the bottom of a coating material pan over time during coating, and functions to stabilize matting properties of the formed hard coat.

Although not intending to be bound by theory, it can be considered that the reason why sedimentation of the aluminum oxide particles having an average particle diameter of 1 to 100 μm (B) can be suppressed by using the aluminum oxide fine particles having an average particle diameter of 1 to 100 nm (C) is that component (C) can adsorb to the surface of component (B) and enhance affinity and solvation with other components in the coating material.

It is preferable to use the aluminum oxide fine particles having an average particle diameter of 1 to 100 nm (C) whose surface is treated with a surface treatment agent such as a silane coupling agent such as vinylsilane or aminosilane; a titanate coupling agent; an aluminate coupling agent; an organic compound having an ethylenic unsaturated bond group such as a (meth)acryloyl group, a vinyl group or an allyl group or a reactive functional group such as an epoxy group; a fatty acid, a fatty acid metal salt, or the like. By using the compound treated with such a surface treatment agent, it is possible to enhance dispersibility of component (C) in the coating material and increase an effect of suppressing the sedimentation of the aluminum oxide particles having an average particle diameter of 1 to 100 μm (B).

According to at least one embodiment, the average particle diameter of the aluminum oxide fine particles having an average particle diameter of 1 to 100 nm (C) may be usually 100 nm or less, preferably 60 nm or less, and more preferably 30 μm or less, from a viewpoint of preventing the hard coat from being cloudy and degrading designability. On the other hand, while there is no particular reason for limiting the lower limit of the average particle diameter of component (C), normally available fine particles may be as small as 1 nm at most.

The amount (in terms of solid content) of the aluminum oxide fine particles having an average particle diameter of 1 to 100 nm (C) may be usually 0.1 part by mass or more, preferably 0.3 parts by mass or more, more preferably 0.6 parts by mass or more, and most preferably 1 part by mass or more, with respect to 100 parts by mass of the active-energy-ray-curable resin (A), from a viewpoint of reliably obtaining an effect of using component (C). On the other hand, from a viewpoint of economic efficiency, the amount of component (C) may be usually 20 parts by mass or less, preferably 10 parts by mass or less, and more preferably 5 parts by mass or less. In one embodiment, the amount of component (C) may be usually 0.1 part by mass or more and 20 parts by mass or less, and preferably 0.1 part by mass or more and 10 parts by mass or less, 0.1 part by mass or less and 5 parts by mass or less, 0.3 parts by mass or more and 20 parts by mass or less, 0.3 parts by mass or more and 10 parts by mass or less, 0.3 parts by mass or more and 5 parts by mass or less, 0.6 part by mass or more and 20 parts by mass or less, 0.6 part by mass or more and 10 parts by mass or less, 0.6 parts by mass or more and 5 parts by mass or less, 1 part by mass or more and 20 parts by mass or less, 1 part by mass or more and 10 parts by mass or less, or 1 part by mass or more and 5 parts by mass or less, with respect to 100 parts by mass of component (A).

(D) Compound Having at Least Two Isocyanate Groups Per Molecule

According to at least one embodiment, the compound having at least two isocyanate groups (—N═C═O) per molecule (D) reacts with component (a2) to form a urethane bond, and functions to improve crack resistance and bending resistance of the hard coat. It also functions to improve adhesion between the hard coat and a film substrate.

Examples of the compound having at least two isocyanate groups (—N═C═O) per molecule (D) include hexamethylene diisocyanate, isophorone diisocyanate, tolylene diisocyanate, and methylene bis-4-cyclohexyl isocyanate; polyisocyanates such as a trimethylolpropane adduct of tolylene diisocyanate, a trimethylolpropane adduct of hexamethylene diisocyanate, a trimethylolpropane adduct of isophorone diisocyanate, an isocyanurate form of tolylene diisocyanate, an isocyanurate form of hexamethylene diisocyanate, an isocyanurate form of isophorone diisocyanate, a biuret form of hexamethylene diisocyanate; urethane cross-linking agents such as blocked isocyanates of the above polyisocyanates, and the like.

As the compound having at least two isocyanate groups (—N═C═O) per molecule (D), a compound having three isocyanates per molecule is preferable, and a compound that is a trimer of hexamethylene diisocyanate and having an isocyanate ring structure (the following formula (3)) and a compound that is a trimer of hexamethylene diisocyanate and is a trimethylolpropane adduct (the following formula (4)) are more preferable, from a viewpoint of crack resistance and bending resistance of the hard coat.

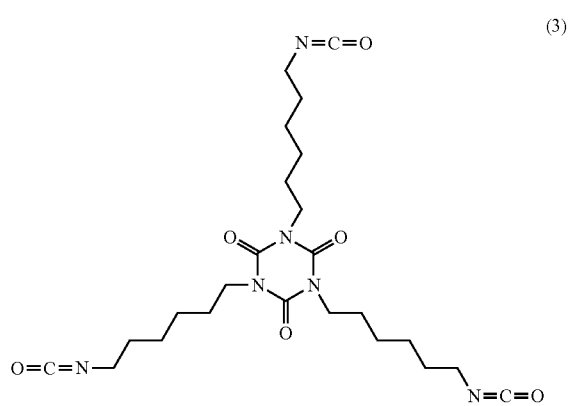

(3)

-continued (4)

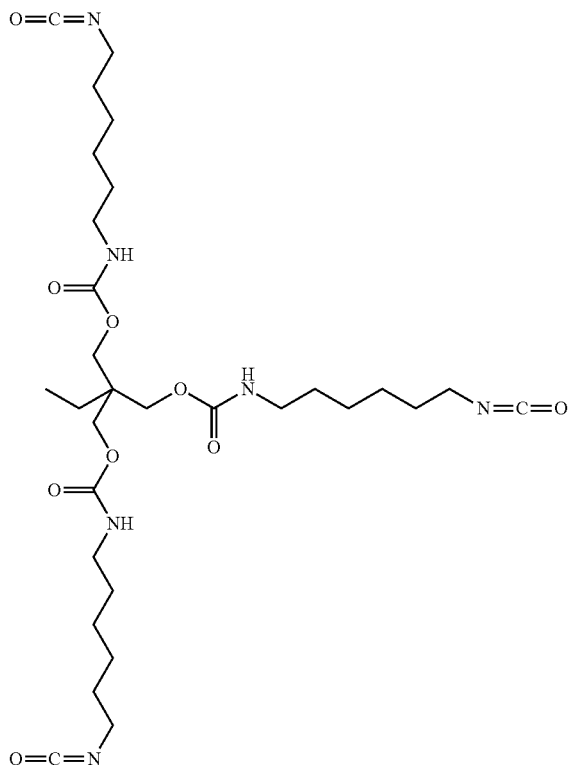

Although not intending to be bound by theory, it can be considered that these have structural features that isocyanate groups are present at respective spaced-apart positions on ends of hexamethylene chains, so that the obtained hard coat is excellent in crack resistance and bending resistance, and also excellent in scratch resistance.

In the coating material according to at least one embodiment, the ratio (a/b) of the number (a) of hydroxyl groups derived from the active-energy-ray-curable resin (A) and the number (b) of isocyanate groups derived from the compound having at least two isocyanate groups (—N=C=O) per molecule (D) may be usually 0.5 or more, preferably 0.7 or more, and more preferably 0.8 or more, from a viewpoint of crack resistance and bending resistance of the hard coat. On the other hand, the ratio (a/b) may be usually 2 or less, preferably 1.5 or less, and more preferably 1.2 or less, from a viewpoint of water resistance of the hard coat and from a viewpoint of sufficiently progressing a crosslinking reaction. In one embodiment, in the coating material, the ratio (a/b) may be usually 0.5 or more and 2 or less, and preferably 0.5 or more and 1.5 or less, 0.5 or more and 1.2 or less, 0.7 or more and 2 or less, 0.7 or more and 1.5 or less, 0.7 or more and 1.2 or less, 0.8 or more and 2 or less, 0.8 or more and 1.5 or less, or 0.8 or more and 1.2 or less.

In the present specification, the number of hydroxyl groups derived from the active-energy-ray-curable resin (A) per unit amount can be determined in accordance with JIS-K1557-1: 2007, by a method of acetylating the hydroxyl groups in component (A) with an acetylating reagent (a pyridine solution of acetic anhydride), then hydrolyzing the excess acetylating reagent with water, and titrating the generated acetic acid with an ethanol solution of potassium hydroxide using an automatic potentiometric titrator "AT-610 type" (trade name) of Kyoto Electronics Manufacturing Co., Ltd. An automatic potentiometric titrator available from another supplier may be used as long as the number per unit amount of hydroxyl groups derived from the active-energy-ray-curable resin (A) can be determined by this method. That is, one skilled in the art can determine the number per unit amount of hydroxyl groups derived from component (A), based on the above standard and by reference to the common general knowledge.

It can be considered that an example in which the number of hydroxyl groups of a resin can be measured by the above-mentioned method despite the structure of the resin contains no hydroxyl groups is attributed to the presence of a hydroxyl group-containing component as a by-product in the resin.

According to at least one embodiment, the number of isocyanate groups derived from the compound having at least two isocyanate groups (—N=C=O) per molecule (D) per unit amount can be determined in accordance with JIS-K7301: 1995, by a method of reacting the isocyanate groups in component (D) with di-n-butylamine, and then titrating the excess di-n-butylamine with an aqueous hydrochloric acid solution, using an automatic potentiometric titrator "AT-610 type" (trade name) of Kyoto Electronics Manufacturing Co., Ltd. An automatic potentiometric titrator available from another supplier may be used as long as the number per unit amount of isocyanate groups derived from the compound having at least two isocyanate groups (—N=C=O) per molecule (D) can be determined by this method. That is, one skilled in the art can determine the number per unit amount of isocyanate groups derived from component (D), based on the above standard and by reference to the common general knowledge.

As the compound having at least two isocyanate groups (—N=C=O) per molecule (D), one kind or a mixture of two or more kinds of them can be used. Further, a catalyst such as dibutyltin dilaurate or dibutyltin diethylhexoate may be added, as desired, as long as it is not contrary to the object of the subject application.

According to at least one embodiment, the amount of the compound having at least two isocyanate groups (—N=C=O) per molecule (D) may be usually 40 parts by mass or less, preferably 35 parts by mass or less, more preferably 30 parts by mass or less, and further preferably 25 parts by mass or less, with respect to 100 parts by mass of the active-energy-ray-curable resin (A), from a viewpoint of curability with active energy ray. On the other hand, it may be usually 0.1 part by mass or more, preferably 1 part by mass or more, more preferably 2 parts by mass or more, and further preferably 5 parts by mass or more, from a viewpoint of reliably obtaining an effect of using the compound having at least two isocyanate groups (—N=C=O) per molecule (D). In one embodiment, the amount of the compound having at least two isocyanate groups (—N=C=O) per molecule (D) may be usually 40 parts by mass or less and 0.1 part by mass or more, and preferably 40 parts by mass or less and 1 part by mass or more, 40 parts by mass or less and 2 parts by mass or more, 40 parts by mass or less and 5 parts by mass or more, 35 parts by mass or less and 0.1 part by mass or more, 35 parts by mass or less and 1 part by mass or more, 35 parts by mass or less and 2 parts by mass or more, 35 parts by mass or less and 5 parts by mass or more, 30 parts by mass or less and 0.1 part by mass or more, 30 parts by mass or less and 1 part by mass or more, 30 parts by mass or less and 2 parts by mass or more, 30 parts by mass or less and 5 parts by mass or more, 25 parts by mass or less and 0.1 part by mass or more, 25 parts by mass or less and 1 part by mass or more, 25 parts by mass or less and 2 parts by mass or more, or 25 parts by mass or less and 5 parts by mass or more, with respect to 100 parts by mass of the active-energy-ray-curable resin (A).

In the coating material according to at least one embodiment, a photopolymerization initiator can be further contained, from a viewpoint of improving curability with active energy ray.

Examples of the photopolymerization initiator include benzophenone compounds such as benzophenone, methyl-o-benzoylbenzoate, 4-methylbenzophenone, 4,4'-bis(diethylamino)benzophenone, methyl o-benzoylbenzoate, 4-phenylbenzophenone, 4-benzoyl-4'-methyldiphenylsulfide, 3,3', 4,4'-tetra(tert-butylperoxycarbonyl)benzophenone and 2,4, 6-trimethylbenzophenone; benzoin compounds such as benzoin, benzoin methyl ether, benzoin ethyl ether, benzoin isopropyl ether and benzyl methyl ketal; acetophenone compounds such as acetophenone, 2,2-dimethoxy-2-phenylacetophenone and 1-hydroxycyclohexyl phenyl ketone; anthraquinone compounds such as methylanthraquinone, 2-ethylanthraquinone and 2-amylanthraquinone; thioxanthone compounds such as thioxanthone, 2,4-diethylthioxanthone and 2,4-diisopropylthioxanthone; alkylphenone compounds such as acetophenone dimethylketal; triazine compounds; biimidazole compounds; acylphosphine oxide compounds; titanocene compounds; oxime ester compounds; oxime phenylacetic acid ester compounds; hydroxyketone compounds; aminobenzoate compounds, and the like. As the photopolymerization initiator, one kind or a mixture of two or more kinds of them can be used.

According to at least one embodiment, the coating material can contain one kind or two or more kinds of optional components such as an active-energy-ray-curable resin other than component (a1) or (a2), inorganic particles (including inorganic fine particles) other than component (B) or (C), a compound having an isocyanate group other than component (D), an antistatic agent, a surfactant, a leveling agent, a thixotropy-imparting agent, an anti-fouling agent, a printability improver, an antioxidant, a weather resistance stabilizer, a light resistance stabilizer, an ultraviolet absorber, a heat stabilizer, organic particles (including organic fine particles), and a colorant, as desired, as long as it is not contrary to the object of the subject application.

The coating material according to at least one embodiment may contain a solvent, as desired, in order to dilute the coating material to a concentration that facilitates coating. The solvent is not particularly limited as long as it does not react with any of components (A) to (D) and other optional components, or does not catalyze (accelerate) a self-reaction (including deterioration reaction) of these components. Examples of the solvent include 1-methoxy-2-propanol, ethyl acetate, n-butyl acetate, toluene, methyl ethyl ketone, methyl isobutyl ketone, diacetone alcohol, acetone, and the like. As the solvent, one kind or a mixture of two or more kinds of them can be used.

The coating material according to at least one embodiment can be obtained by mixing and stirring these components.

The method of forming a hard coat using the coating material according to at least one embodiment is not particularly limited, and a known web coating method can be used. Examples of the method include roll coating, gravure coating, reverse coating, roll brushing, spray coating, air knife coating, die coating, etc.

Examples of a preferable method for forming a hard coat using the coating material according to at least one embodiment include methods comprising steps of:

(1) forming a wet coat of the coating material according to at least one embodiment on at least one surface of a film substrate;
(2) preliminarily drying the wet coat obtained in step (1) above to obtain a dried coat;
(3) superimposing and temporarily sticking an active-energy-ray-transmissive film on a surface of the dried coat of the laminate obtained in step (2) above; and
(4) irradiating the laminate obtained in step (3) above with active energy rays to cure the dried coat.

This method can suppress oxygen disorder and enhance curability of the coating material.

According to at least one embodiment, the film substrate used in step (1) above is not particularly limited, and any resin film can be used as a film substrate. Examples of the resin film include polyester resins such as aromatic polyesters and aliphatic polyesters; acrylic resins; polycarbonate resins; poly (meth)acrylimide resins; polyolefin resins such as polyethylene, polypropylene, and polymethylpentene; cellulose resins such as cellophane, triacetyl cellulose, diacetyl cellulose and acetyl cellulose butyrate; styrene resins such as polystyrene, acrylonitrile-butadiene-styrene copolymer resins (ABS resins), styrene-ethylene-butadiene-styrene copolymers, styrene-ethylene-propylene-styrene copolymers and styrene-ethylene-ethylene-propylene-styrene copolymers; polyvinyl chloride resins; polyvinylidene chloride resins; fluorine-containing resins such as polyvinylidene fluoride; and other resin films such as polyvinyl alcohol, ethylene vinyl alcohol, polyether ether ketone, nylon, polyamide, polyimide, polyurethane, polyetherimide, polysulfone, and polyethersulfone. These films include unstretched films, uniaxially stretched films, and biaxially stretched films. Also included are laminated films obtained by laminating two or more layers of one or more of these films.

In a case where the film substrate is one of constituent layers of the decorative sheet, a wet coat forming surface of the film substrate may be subjected to an easy adhesion treatment such as corona discharge treatment or anchor coat formation, from a viewpoint of enhancing adhesion between the film substrate and a hard coat.

Also, in the case where the film substrate is one of constituent layers of the decorative sheet, the thickness of the film substrate is not particularly limited, but it may be usually 20 μm or more, and preferably 30 μm or more, from a viewpoint of handling properties. From a viewpoint of design, the thickness may be usually 50 μm or more, and preferably 80 μm or more. On the other hand, the thickness may be usually 2000 μm or less, preferably 800 μm or less, and more preferably 300 μm or less, from a viewpoint of thinning the decorative sheet. In the case where the film substrate is one of constituent layers of the decorative sheet, in one embodiment, the thickness of the film substrate may be 20 μm or more and 2000 μm or less, 20 μm or more and 800 μm or less, 20 μm or more and 300 μm or less, 30 μm or more and 2000 μm or less, 30 μm or more and 800 μm or less, 30 μm or more and 300 μm or less, 50 μm or more and 2000 μm or less, 50 μm or more and 800 μm or less, 50 μm or more and 300 μm or less, 80 μm or more and 2000 μm or less, 80 μm or more and 800 μm or less, or 80 μm or more and 300 μm or less.

According to at least one embodiment, the thickness of the film substrate is substantially constant over the entire film substrate. The "substantially constant thickness" herein means that it is within a range of about −5 to +5 μm, which is a deflection width of process/quality control which is commonly carried out industrially (the same applies to the following explanation about the thickness of other film substrate, film, and hard coat). For example, when setting the thickness of the film substrate to be manufactured to 100 µm, in a case of causing a fluctuation of −5 to +5 µm at maximum such that the thickness of a certain portion of the film is 95 µm and the thickness of another portion of the film is 105 µm, it can be said that the film has a substantially constant thickness of 100 µm.

When a hard coat formed on a surface of the film substrate is transferred to another film substrate for use, a wet coat forming surface of the film substrate may be subjected to an easy release treatment. Any known easy release treatment may be used.

Also, when a hard coat formed on a surface of the film substrate is transferred to another film substrate for use, the thickness of the film substrate is not particularly limited, but it may be usually 20 µm or more, and preferably 30 µm or more, from a viewpoint of handling properties. On the other hand, from a viewpoint of economic efficiency, the thickness of the film substrate may be usually 100 µm or less, and preferably 75 µm or less. When a hard coat formed on a surface of the film substrate is transferred to another film substrate for use, in one embodiment, the thickness of the film substrate may be usually 20 µm or more and 100 µm or less, preferably 20 µm or more and 75 µm or less, 30 µm or more and 100 µm or less, or 30 µm or more and 75 µm or less.

The method of forming a wet coat of the coating material according to at least one embodiment in step (1) above is not particularly limited. Examples of the method include roll coating, gravure coating, reverse coating, roll brush, spray coating, air knife coating, die coating, etc.

In step (2) above, the wet coat obtained in step (1) above is preliminarily dried to be a dried coat. The preliminary drying can be carried out by passing a web at a line speed, for example, such that the time required for passing the web from an inlet to an outlet in a drying furnace set at a temperature of about 23 to 150° C. and preferably at a temperature of 50 to 120° C. is about 0.5 to 10 minutes, and preferably 1 to 5 minutes.

In step (3) above, an active-energy-ray-transmissive film is superimposed and temporarily stuck on a surface of the dried coat of the laminate obtained in step (2) above. Thereby, oxygen disorder of the curing reaction of the active-energy-ray-curable resin composition with active energy ray irradiation can be suppressed.

An example of a method of superimposing and temporarily sticking the active-energy-ray-transmissive film on the surface of the dried coat will be described with reference to FIG. 2. A laminate 5 obtained in step (2) above is placed on a rotating heating drum 6 preheated to a desired temperature so that the surface of the laminate 5 on the opposite side to the dried coat is on the heating drum 6 side, further, an active-energy-ray-transmissive film 7 (for example, an embossed transfer film) is placed on the surface of the dried coat, and they are pressed by a pressing roll 8. A laminate 9 on which the active-energy-ray-transmissive film 7 is superimposed and temporarily stuck on the surface of the dried coat is released from the heating drum 6 by a guide roll 10 and sent to step (4).

According to at least one embodiment, the active-energy-ray-transmissive film is a film having an active energy ray transmittance of usually 70% or more, and preferably 80% or more. Here, the active energy ray transmittance is a ratio of an integrated area of transmission spectra of active energy rays at wavelengths of 200 to 600 nanometers to an integrated area of transmission spectra when it is assumed that a transmittance of active energy rays in a whole range of wavelengths of 200 to 600 nanometers is 100%. The active energy ray transmittance is a value measured with light incident on a film at an incident angle of 00, using a spectrophotometer "SolidSpec-3700" (trade name) of Shimadzu Corporation.

Preferable examples of the active-energy-ray-transmissive film include biaxially oriented polyethylene terephthalate resin films, biaxially oriented polypropylene resin films, fluorine-containing resin films, and the like.

A bonding surface of the active-energy-ray-transmissive film with the dried coat may be highly smooth or may be engraved with an embossed pattern.

In step (4) above, the laminate obtained in step (3) above is usually irradiated with active energy rays from a surface of the active-energy-ray-transmissive film side. Thereby, the dried coat is cured, and a hard coat is formed.

Examples of the active energy ray used in step (4) above include ionizing radiation such as ultraviolet rays and electron beams, and the like. Other examples of the active energy ray used in step (4) above include white active energy rays using a high pressure mercury lamp, a metal halide lamp or the like as a light source. Alternatively, white active energy rays may be monochromatized using filters such as a 365 filter (short wave cut filter), a 254 filter (long wave cut filter), and a 300 filter, and the monochromatized rays may be then used.

According to at least one embodiment, the irradiation dose of the active energy ray in step (4) above is appropriately adjusted according to curing characteristics of the active-energy-ray-curable resin composition, thickness of hard coat, line speed, and the like. The irradiation dose may be usually 10 to 10,000 mJ/cm$^2$, and preferably 50 to 1000 mJ/cm$^2$.

Other examples of a preferable method for forming a hard coat using the coating material according to at least one embodiment include methods comprising steps of:
(1') forming a wet coat of the coating material according to at least one embodiment on at least one surface of an active-energy-ray-transmissive film;
(2') preliminarily drying the wet coat obtained in step (1') above to obtain a dried coat;
(3') superimposing and temporarily sticking a film substrate on the surface of the dried coat obtained in step (2') above; and
(4') irradiating the laminate obtained in step (3') above with active energy rays to cure the dried coat.

The method, according to various embodiments, described later has an advantage that it can also be applied to a film substrate having low solvent resistance, as compared to the aforementioned method. The aforementioned method has an advantage that it is easy to enhance adhesion between a film substrate and a hard coat in the case where the film substrate is one of constituent layers of the decorative sheet, as compared to the method described later. Also, either of these methods can suppress oxygen disorder and enhance curability of the coating material.

The method of forming a wet coat of the coating material according to at least one embodiment in step (1') above is not particularly limited. Examples of the method include roll coating, gravure coating, reverse coating, roll brushing, spray coating, air knife coating, die coating, etc. The active-energy-ray-transmissive film has been described in the description of step (3) of the aforementioned method.

In step (2') above, the wet coat obtained in step (1') above is preliminarily dried to be a dried coat. The preliminary drying can be carried out by passing a web at a line speed, for example, such that the time required for passing the web from an inlet to an outlet in a drying furnace set at a temperature of about 23 to 150° C. and preferably at a temperature of 50 to 120° C. is about 0.5 to 10 minutes, and preferably 1 to 5 minutes.

In step (3') above, the film substrate is superimposed and temporarily stuck on the surface of the dried coat obtained in step (2') above. Thereby, oxygen disorder of the curing reaction of the active-energy-ray-curable resin composition with active energy ray irradiation can be suppressed. For the film substrate, the same film substrate as that in the description of step (1) of the aforementioned method can be used.

In step (4') above, the laminate obtained in step (3') above is usually irradiated with active energy rays from a surface of the active-energy-ray-transmissive film side, so that the dried coat is cured, and a hard coat is formed. The active energy ray and its irradiation dose can be the same as those in the description of step (4) of the aforementioned method.

2. Decorative Sheet

The decorative sheet according to at least one embodiment is a decorative sheet having a hard coat formed by using the coating material according to at least one embodiment. The hard coat formed by using the coating material according to at least one embodiment is usually formed as a surface protective layer on a front surface (a surface usually viewed in actual use) of the decorative sheet according to at least one embodiment. Here, the actual use refers to a state in which the decorative sheet is used for decorating the surface of an article (including various types).

Examples of the decorative sheet according to at least one embodiment include a decorative sheet provided with a printed layer on a surface to be a front surface side of a thermoplastic resin film, and further having a hard coat formed by using the coating material according to at least one embodiment on the surface of the printed layer.

According to at least one embodiment, the thermoplastic resin film is a layer to be a substrate of the decorative sheet. Usually, the thermoplastic resin film is colored and functions to conceal an adherend from a viewpoint of design.

Examples of the thermoplastic resin film include polyvinyl chloride resins; polyester resins such as aromatic polyesters and aliphatic polyesters; polyolefin resins such as polyethylene, polypropylene, and polymethylpentene; acrylic resins; polycarbonate resins; poly (meth)acrylimide resins; styrene resins such as polystyrene, acrylonitrile-butadiene-styrene copolymer resins (ABS resins), styrene-ethylene-butadiene-styrene copolymers, styrene-ethylene-propylene-styrene copolymers and styrene-ethylene-ethylene-propylene-styrene copolymers; cellulose resins such as cellophane, triacetyl cellulose, diacetyl cellulose and acetyl cellulose butyrate; polyvinylidene chloride resins; fluorine-containing resins such as polyvinylidene fluoride; and other resin films such as polyvinyl alcohol, ethylene vinyl alcohol, polyether ether ketone, nylon, polyamide, polyimide, polyurethane, polyetherimide, polysulfone, and polyethersulfone. These films include unstretched films, uniaxially stretched films, and biaxially stretched films. Also included are laminated films obtained by laminating two or more layers of one or more of these films.

A colorant in a case of coloring the thermoplastic resin film is not particularly limited, and any colorant can be used. Examples of the colorant include titanium oxide, carbon black, and the like. As the colorant, one kind or a mixture of two or more kinds of them can be used. The amount of the colorant is usually about 0.1 to 40 parts by mass, based on 100 parts by mass of the base resin used for the thermoplastic resin film, although it also depends on the type of the colorant and desired concealing property.

According to at least one embodiment, the thickness of the thermoplastic resin film is not particularly limited, but may be preferably 50 µm or more and more preferably 75 µm or more, from a viewpoint of handleability during production of the decorative sheet. On the other hand, the thickness may be usually 300 µm or less and preferably 200 µm or less, from a viewpoint of workability when depositing the decorative sheet on an article.

In one embodiment, the thickness of the thermoplastic resin film may be preferably 50 µm or more and 300 µm or less, 50 µm or more and 200 µm or less, 75 µm or more and 300 µm or less, or 75 µm or more and 200 µm or less.

The printed layer may be provided for imparting high designability, and it can be formed by printing an arbitrary pattern with any ink using any printing machine.

According to at least one embodiment, the printed layer can be applied in whole or in part on the front surface side of the thermoplastic resin film, directly or via an anchor coat. Examples of the pattern include a metal-like pattern such as hair lines, a grain pattern, a stone mesh pattern imitating a surface of a rock such as marble, a fabric pattern imitating texture or a cloth-like pattern, a tile stitch pattern, a brick-work pattern, a parquet pattern, and a patchwork. As the printing ink, a suitable mixture of a pigment, a solvent, a stabilizer, a plasticizer, a catalyst, a curing agent and the like with a binder can be used. Examples of compounds usable as the binder include a resin such as a polyurethane resin, a vinyl chloride-vinyl acetate copolymer resin, a vinyl chloride-vinyl acetate-acrylic copolymer resin, a chlorinated polypropylene resin, an acrylic resin, a polyester resin, a polyamide resin, a butyral resin, a polystyrene resin, a nitrocellulose resin and a cellulose acetate resin, and a resin composition thereof. Further, in order to provide a metallic design, aluminum, tin, titanium, indium and oxides thereof may be deposited in whole or in part on the front side surface of the thermoplastic resin film, directly or via an anchor coat, by a known method.

A method for forming a hard coat on the surface of the printed layer formed on the front side surface of the thermoplastic resin film, directly or via an anchor coat, using the coating material according to at least one embodiment, is not particularly limited, and a known web coating method can be used. Examples of the method include roll coating, gravure coating, reverse coating, roll brushing, spray coating, air knife coating, die coating, etc.

The thickness of a matte hard coat formed by using the coating material according to at least one embodiment is not particularly limited, but it may be usually 1 µm or more, preferably 5 µm or more, and more preferably 10 µm or more, from a viewpoint of surface hardness. Also, the thickness of the matte hard coat may be preferably 100 µm or less and more preferably 50 µm or less, from a viewpoint of secondary processability and web handling properties of the decorative sheet according to at least one embodiment.

In one embodiment, the thickness of the matte hard coat may be preferably 1 µm or more and 100 µm or less, 1 µm or more and 50 µm or less, 5 µm or more and 100 µm or less, 5 µm or more and 50 µm or less, and 10 µm or more and 100 µm or less, or 10 µm or more and 50 µm or less.

The anchor coating agent for forming the anchor coat is not particularly limited, and any anchor coating agent can be used. Examples of the anchor coating agent include polyester type, acrylic type, polyurethane type, acrylic urethane type, and polyester urethane type anchor coating agents. As the anchor coating agent, one or more of them can be used.

According to at least one embodiment, the anchor coating agent may contain one kind or two or more kinds of additives such as an antioxidant, a weather resistance stabilizer, a light resistance stabilizer, an ultraviolet absorber, a heat stabilizer, an antistatic agent, a surfactant, a colorant, an infrared shielding agent, a leveling agent, a thixotropy-imparting agent and a filler, as desired, as long as it is not contrary to the object of the subject application.

A method of forming the anchor coat using the anchor coating agent is not particularly limited, and a known web coating method can be used. Examples of the method include roll coating, gravure coating, reverse coating, roll brushing, spray coating, air knife coating, die coating, etc.

The thickness of the anchor coat is not particularly limited, but it may be usually about 0.01 to 5 μm, and preferably 0.1 to 2 μm.

From a viewpoint of improving adhesion to an adherend to be decorated using the decorative sheet according to at least one embodiment, a pressure-sensitive adhesive layer or an adhesive layer may be formed on the decorative sheet according to at least one embodiment directly or via an anchor coat, on a surface opposite to a front surface side of the thermoplastic resin film.

FIG. 1 is a conceptual diagram of a cross section showing an example of a decorative sheet (and a pressure-sensitive adhesive layer) according to at least one embodiment. It has a hard coat 1 formed from a coating material according to at least one embodiment, a printed layer 2, a colored thermoplastic resin film 3, and a pressure-sensitive adhesive layer 4, in order from the surface side.

EXAMPLES

Hereinafter, the various embodiments will be described with reference to examples, but the various embodiments are not limited thereto.

Measuring Method (i) 60 Degree Gloss Value (Matting Properties)

A 60 degree gloss value on a hard coat surface was measured in accordance with JIS Z8741: 1997, using a multi-angle gloss meter "GM-268" (trade name) of Konica Minolta, Inc.

(ii) Taber Abrasion (Scratch Resistance 1)

A hard coat surface of a sample taken from a decorative sheet was abraded in accordance with JIS K7204: 1999, under conditions of an abrasive wheel CS 17, a rotational speed of 72 rpm, a load of 1 Kg, and cleaning the abrasive wheel at every 100 rotations, using a Taber abrasion tester available from Tester Sangyo Co., Ltd. When cleaning the abrasive wheel, the hard coat surface of the sample was visually observed to judge whether or not abrasion reached the printed layer, and the number of rotations until abrasion reached the printed layer was determined. For example, when the value in the table is 5000, it means that abrasion did not reach the printed layer at 5000 rotations, but reached the printed layer at 5100 rotations.

(iii) Steel Wool Resistance (Scratch Resistance 2)

A decorative sheet was placed on a Gakushin tester of JIS L0849: 2013 such that a hard coat thereof was a front side and a reciprocating direction of a friction terminal and a machine direction of the decorative sheet were parallel to each other. Subsequently, #0000 steel wool was attached to the friction terminal of the Gakushin tester, then a load of 500 g was placed, and a surface of the test piece was rubbed reciprocatingly 10 times, under conditions of a moving distance of 60 mm and a speed of 1 reciprocating/sec. The friction portion was visually observed and evaluated according to the following criteria.

⊚: No scratch was observed.
○: There were 1 to 3 scratches.
Δ: There were 4 to 10 scratches.
x: There were 11 or more scratches.

(iv) Mandrel Test (Crack Resistance, Bending Resistance)

A flex resistance test by a cylindrical mandrel method was carried out in accordance with JIS K5600-5-1: 1999, using a sample taken from a decorative sheet to make a decorative sheet of 100 mm in machine direction and 50 mm in transverse direction. The diameter of the mandrel with the smallest diameter among the mandrels where cracking did not occur was determined.

Although the diameters of the mandrels defined in JIS K5600-5-1: 1999 are 2 mm, 3 mm, 4 mm, 5 mm, 6 mm, 8 mm, 10 mm, 12 mm, 16 mm, 20 mm, 25 mm, and 32 mm, a mandrel having a diameter outside the JIS standard was also used, as it is apparent from entries in Tables 1 and 2 relating to Examples 4, 5, and 11 to 17.

Raw Materials Used (A) Active-energy-ray-curable resin (a1) Polyfunctional (meth)acrylate (a1-1) An ethanolamine-modified polyether acrylate having 4 acryloyl groups per molecule was synthesized, in accordance with paragraph 0055 of JP-A-2013-064098. The number of hydroxyl groups per unit amount was 1.09 mol/Kg.

(a1-2) An ethoxylated bisphenol A diacrylate "NK Ester A-BPE-4" (trade name) available from Shin Nakamura Chemical Co., Ltd.: no hydroxyl group.

(a1-3) A dipentaerythritol hexaacrylate available from Nippon Kayaku Co., Ltd.: a number of hydroxyl groups per unit amount of 0.668 mol/Kg.

(a1-4) An ethoxylated trimethylolpropane triacrylate "A-TMPT-3EO" (trade name) available from Shin Nakamura Chemical Co., Ltd.: no hydroxyl group.

(a2) Acrylamide compound having at least one hydroxyl group per molecule (a2-1) Hydroxyethylacrylamide ($CH_2$=CH—CO—NH—$(CH_2)_2$—OH) available from KJ Chemicals Corporation: a number of hydroxyl groups per unit amount of 8.7 mol/Kg.

(B) Aluminum oxide particles having average particle diameter of 1 to 100 μm (B-1) Spherical aluminum oxide particles "Alunabeads CB-P10" (trade name) available from Showa Denko K.K., average particle diameter of 10 μm.

(C) Aluminum oxide fine particles having average particle diameter of 1 to 100 nm (C-1) A dispersion liquid of aluminum oxide fine particles surface-treated with a silane coupling agent: average particle diameter 20 nm, solid content (content of aluminum oxide fine particles) of 37% by mass. It should be noted that the table indicates the blending amount as a dispersion.

(D) Compound having at least two isocyanate groups per molecule (D-1) Polyisocyanate "RV2" (trade name) containing the above formula (3) as a measure component, available from Light Chemical Industries Co., Ltd.: a number of isocyanate groups per unit amount of 5.95 mol/Kg.

(D-2) Polyisocyanate "Duranate P301-75E" (trade name) containing a hexamethylene diisocyanate trimethylolpropane adduct as a measure component, available from Asahi Kasei Corporation: a number of isocyanate groups per unit amount of 2.98 mol/Kg.

(E) Other components (E-1) Acetophenone photopolymerization initiator (2-hydroxy-1-{4-[4-(2-hydroxy-2-methyl-propionyl)-benzyl]phenyl}-2-methyl-propan-1-one) "IRGACURE 127" (trade name) available from BASF Corporation.

(E-2) Acetophenone photopolymerization initiator (1-hydroxy-cyclohexyl-phenylketone) "IRGACURE 184" (trade name) available from BASF Corporation.

(E-3) Anti-cratering agent "Polyflow 75" (trade name) available from Kyoeisha Chemical Co., Ltd., a solid content of 100% by mass.

(E-4) 1-Methoxy-2-propanol

Example 1

1. Preparation of Coating Material

50 Parts by mass of the component (a1-1), 40 parts by mass of the component (a1-2), 10 parts by mass of the component (a2-1), 70 parts by mass of the component (B-1), 3 parts by mass (1.11 part by mass in terms of solid content) of the component (C-1), 20 parts by mass of the component (D-1), 2 parts by mass of the component (E-1), 3 parts by mass of the component (E-2), 2 parts by mass of the component (E-3), and 30 parts by mass of the component (E-4) were mixed and stirred to obtain a coating material. The ratio (a/b) of the number (a) of hydroxyl groups derived from the component (A) and the number (b) of isocyanate groups derived from the component (D) is calculated as 1.19, based on the types of the raw materials used and the blending ratio thereof.

2. Production of Decorative Sheet (2-1) An ink containing a vinyl chloride-vinyl acetate copolymer as a medium was used to form a wood grain patterned printed layer having a thickness of 1 μm, on one side of a brown colored polyvinyl chloride resin film "FC26543" (trade name) having a thickness of 120 μm available from Riken Technos Corporation, and further, the coating material obtained above was used to form a coat by the use of a film Meyer bar coating apparatus, so that the thickness after drying was 15 μm.

Figure 2:
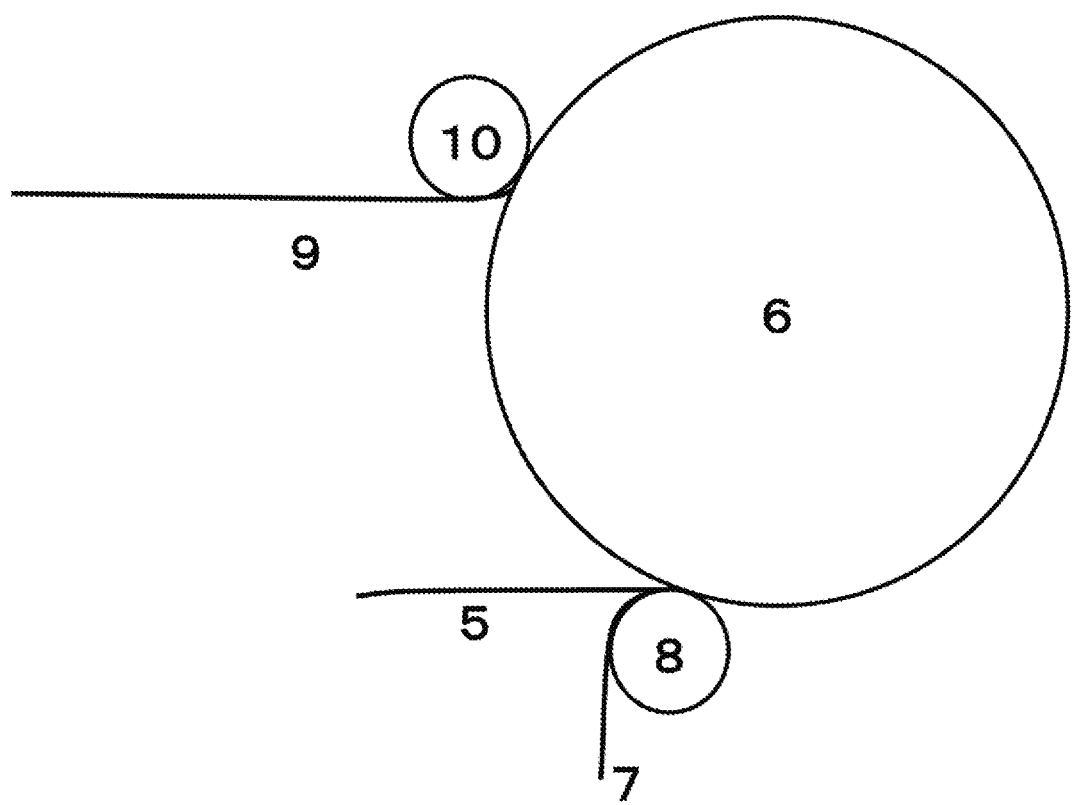
FIG. 2 is a conceptual diagram of a laminating apparatus.

(2-2) Next, using an apparatus shown in the conceptual diagram of FIG. 2, a laminate 5 obtained in the above (2-1) was placed on a rotating heating drum 6 preheated to a temperature of 30° C. so that the surface of the laminate 5 on the opposite side to the dried coat was on the heating drum 6 side, and further, an embossed transfer film "R-107" (trade name) made of a polypropylene resin of Riken Technos Corporation was superimposed on the dried coat so that the embossed surface was on the laminate 5 side, and they were pressed by a pressing roll 8 to be temporarily stuck. A laminate 9 of the laminate 5 and the embossed transfer film was released from the heating drum 6 by a guide roll 10.

(2-3) Next, using a high-pressure mercury lamp type ultraviolet irradiator, the laminate 9 was irradiated with active energy rays from the embossed transfer film surface side under a condition of an accumulated light amount of 240 mJ/cm² to cure the dried coat, thereby forming a hard coat.

(2-4) Subsequently, the embossed transfer film was peeled off to obtain a decorative sheet having the layer of the brown colored polyvinyl chloride resin film, the printed layer, and the hard coat in this order.

3. Evaluation of Decorative Sheet

The above tests (i) to (iv) were carried out on the obtained decorative sheet. The results are shown in Table 1. In addition, a 60 degree gloss value around a central portion in a transverse direction of the decorative sheet was measured at 20 points at every 100 m in a machine direction according to the method of the above test (i), and a standard deviation of the 60 degree gloss value was determined from the obtained 20 measured values. The standard deviation was 1.7, and it can be evaluated that matting properties were stable.

Examples 2 to 10

Decorative sheets were produced in the same manner as in Example 1 except that the formulation of each coating material was changed as shown in Table 1 or 2. The above tests (i) to (iv) were carried out on the obtained decorative sheets. The results are shown in Table 1 or 2.

For each of Examples 8 and 9, the standard deviation of the 60 degree gloss value was also measured according to the above method. The standard deviation in Example 8 was 2.4, and the standard deviation in Example 9 was 5.7.

Example 11

18 Parts by mass of the component (a1-1), 80 parts by mass of the component (a1-3), 2 parts by mass of the component (a2-1), 70 parts by mass of the component (B-1), 3 parts by mass (1.11 part by mass in terms of solid content) of the component (C-1), 15 parts by mass of the component (D-1), 2 parts by mass of the component (E-1), 3 parts by mass of the component (E-2), 2 parts by mass of the component (E-3), and 30 parts by mass of the component (E-4) were mixed and stirred to obtain a coating material. The ratio (a/b) of the number (a) of hydroxyl groups derived from the component (A) and the number (b) of isocyanate groups derived from the component (D) is calculated as 1.01, based on the types of the raw materials used and the blending ratio thereof. A decorative sheet was produced in the same manner as in Example 1 except that the coating material was used, and the obtained decorative sheet was evaluated by the above tests (i) to (iv). The results are shown in Table 2. Further, the standard deviation of the 60 degree gloss value obtained according to the above method was 1.8, and it can be evaluated that matting properties were stable.

Examples 12 to 18

Decorative sheets were produced in the same manner as in Example 1 except that the formulation of each coating material was changed as shown in Table 2. The above tests (i) to (iv) were carried out on the obtained decorative sheets. The results are shown in Table 2.

For each of Examples 16 and 17, the standard deviation of the 60 degree gloss value was also measured according to the above method. The standard deviation in Example 16 was 2.3, and the standard deviation in Example 17 was 5.9.

Examples 19 to 20

Decorative sheets were produced in the same manner as in Example 1 except that the formulation of each coating material was changed as shown in Table 2. The above tests (i) to (iv) were carried out on the obtained decorative sheets. The results are shown in Table 2.

TABLE 1

|  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Formulation of coating material (parts by mass) | a1-1 | 50 | 44 | 54 | 56 | 50 | 50 | 50 | 50 | 50 |
|  | a1-2 | 40 | 36 | 43 | 44 | 40 | 40 | 40 | 40 | 40 |
|  | a1-3 | — | — | — | — | — | — | — | — | — |
|  | a1-4 | — | — | — | — | — | — | — | — | — |
|  | a2-1 | 10 | 20 | 3 | — | 10 | 10 | 10 | 10 | 10 |
|  | B-1 | 70 | 70 | 70 | 70 | 120 | 30 | — | 70 | 70 |
|  | C-1 | 3 | 3 | 3 | 3 | 3 | 3 | 3 | 0.5 | — |
|  | D-1 | 20 | 20 | 20 | 20 | 20 | 20 | 20 | 20 | 20 |
|  | D-2 | — | — | — | — | — | — | — | — | — |
|  | E-1 | 2 | 2 | 2 | 2 | 2 | 2 | 2 | 2 | 2 |
|  | E-2 | 3 | 3 | 3 | 3 | 3 | 3 | 3 | 3 | 3 |
|  | E-3 | 2 | 2 | 2 | 2 | 2 | 2 | 2 | 2 | 2 |
|  | E-4 | 30 | 30 | 30 | 30 | 30 | 30 | 30 | 30 | 30 |
|  | Ratio a/b | 1.19 | 1.87 | 0.71 | 0.51 | 1.19 | 1.19 | 1.19 | 1.19 | 1.19 |
| Evaluation results | 60 Degree gloss value | 30 | 35 | 28 | 35 | 15 | 40 | 85 | 30 | 30 |
|  | Scratch resistance1 | 5000 | 3000 | 4000 | 4000 | 10000 | 2000 | 100 | 3000 | 2000 |
|  | Scratch resistance2 | ○ | ○ | ○ | ○ | ○ | ○ | ○ | ○ | ○ |
|  | Mandrel test mm | 5 | 4 | 10 | 30 | 15 | 4 | 3 | 3 | 3 |

TABLE 2

|  |  | Ex. 10 | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|---|---|
| Formulation of coating material (parts by mass) | a1-1 | 50 | 18 | 20 | 18 | 18 | 18 | 18 | 18 | — | 33 | — |
|  | a1-2 | 40 | — | — | — | — | — | — | — | — | 27 | 18 |
|  | a1-3 | — | 80 | 80 | 80 | 80 | 80 | 80 | 80 | — | — | 80 |
|  | a1-4 | — | — | — | — | — | — | — | — | 90 | — | — |
|  | a2-1 | 10 | 2 | — | 2 | 2 | 2 | 2 | 2 | 10 | 40 | 2 |
|  | B-1 | 70 | 70 | 70 | 120 | 30 | — | 70 | 70 | 70 | 70 | 70 |
|  | C-1 | 3 | 3 | 3 | 3 | 3 | 3 | 0.5 | — | 3 | 3 | 3 |
|  | D-1 | — | 15 | 15 | 15 | 15 | 15 | 20 | 20 | 20 | 20 | 10 |
|  | D-2 | 35 | — | — | — | — | — | — | — | — | — | — |
|  | E-1 | 2 | 2 | 2 | 2 | 2 | 2 | 2 | 2 | 2 | 2 | 2 |
|  | E-2 | 3 | 3 | 3 | 3 | 3 | 3 | 3 | 3 | 3 | 3 | 3 |
|  | E-3 | 2 | 2 | 2 | 2 | 2 | 2 | 2 | 2 | 2 | 2 | 2 |
|  | E-4 | 30 | 30 | 30 | 30 | 30 | 30 | 30 | 30 | 30 | 30 | 30 |
|  | Ratio a b | 1.36 | 1.01 | 0.84 | 1.01 | 1.01 | 1.01 | 0.76 | 0.76 | 0.73 | 1.19 | 1.19 |
| Evaluation results | 60 Degree gloss value | 30 | 30 | 30 | 15 | 40 | 85 | 30 | 30 | 40 | 35 | 30 |
|  | Scratch resistance1 | 3000 | 7000 | 5000 | 11000 | 2000 | 100 | 3000 | 2000 | 1000 | 500 | 4000 |
|  | Scratch resistance2 | Δ | ◎ | ◎ | ◎ | ◎ | ◎ | ◎ | ◎ | X | X | ○ |
|  | Mandrel test mm | 3 | 30 | 60 | 40 | 30 | 30 | 30 | 30 | 3 | 2 | 40 |

It was found that each decorative sheet having the hard coat formed from the coating material according to at least one embodiment had good matte design. The decorative sheets of Example 1 and some other examples had sufficient crack resistance and bending resistance for so-called 2D molding such as profile wrapping lamination, and scratch resistance was also good. The decorative sheets of Example 11 and some other examples had sufficient crack resistance and bending resistance for so-called 1D molding such as flat lamination, and scratch resistance was very good.

REFERENCE SIGNS LIST

1 Hard coat
2 Printed layer
3 Layer of thermoplastic resin film
4 Pressure-sensitive adhesive layer
5 Laminate having film substrate and predried coat in this order
6 Heating drum
7 Active-energy-ray-transmissive film (embossed transfer film)
8 Pressing roll
9 Laminate having film substrate, predried coat, and active-energy-ray-transmissive film in this order
10 Guide roll
20

The invention claimed is:

1. A coating material, comprising:
(A) 100 parts by mass of an active-energy-ray-curable resin;
(B) 5 to 200 parts by mass of aluminum oxide particles having an average particle diameter of 1 to 100 μm, the aluminum oxide particles being not treated by any surface treatment agent;
(C) 0.6 to 10 parts by mass of aluminum oxide fine particles having an average particle diameter of 1 to 100 nm, the aluminum oxide fine particles being treated by a surface treatment agent that is a silane coupling agent; and
(D) 0.1 to 40 parts by mass of a compound having at least two isocyanate groups per molecule,
wherein the active-energy-ray-curable resin (A) comprises:
(a1) 70% to 99% by mass of a polyfunctional (meth) acrylate and
(a2) 30% to 1% by mass of an acrylamide compound having at least one hydroxyl group per molecule, and the sum total of the amount of the polyfunctional (meth)acrylate (a1) and the amount of the acrylamide compound (a2) having at least one hydroxyl group per molecule is 100% by mass, and wherein the polyfunctional (meth)acrylate (a1) consists of at least one selected from the group consisting of diethylene glycol di(meth)acrylate, neopentyl glycol di(meth)acrylate, 1,6-hexanediol di(meth)acrylate, polyethylene glycol di(meth)acrylate, 2,2'-bis(4-(meth)acryloyloxypolyethyleneoxyphenyl) propane, 2,2'-bis(4-(meth)acryloyloxypolypropyleneoxyphenyl) propane; trimethylolpropane tri(meth)acrylate, trimethylolethane tri(meth)acrylate, pentaerythritol tri(meth)acrylate; pentaerythritol tetra(meth)acrylate; dipentaerythritol hexaacrylate; tripentaerythritol acrylate; and oligomers, prepolymers or polymers containing one or more of diethylene glycol di(meth)acrylate, neopentyl glycol di(meth)acrylate, 1,6-hexanediol di(meth)acrylate, polyethylene glycol di(meth)acrylate, 2,2'-bis(4-(meth)acryloyloxypolyethyleneoxyphenyl) propane, 2,2'-bis(4-(meth)acryloyloxypolypropyleneoxyphenyl) propane; trimethylolpropane tri(meth)acrylate, trimethylolethane tri(meth)acrylate, pentaerythritol tri(meth)acrylate; pentaerythritol tetra(meth)acrylate; dipentaerythritol hexaacrylate; and tripentaerythritol acrylate as constituent monomer; an ethanolamine-modified polyether (meth)acrylate having at least three (meth)acryloyl groups per molecule; and a polyfunctional (meth)acrylate having a bisphenol A structure.

2. The coating material according to claim 1, wherein the polyfunctional (meth)acrylate (a1) contains an ethanolamine-modified polyether (meth)acrylate having at least three (meth)acryloyl groups per molecule, and the active-energy-ray-curable resin (A) comprises 20% to 90% by mass of the ethanolamine-modified polyether (meth)acrylate having at least three (meth)acryloyl groups per molecule, based on 100% by mass of the sum total of the amount of the polyfunctional (meth)acrylate (a1) and the amount of the acrylamide compound (a2) having at least one hydroxyl group per molecule.

3. The coating material according to claim 1, wherein the polyfunctional (meth)acrylate (a1) contains a polyfunctional (meth)acrylate having a bisphenol A structure, and the active-energy-ray-curable resin (A) comprises 15% to 90% by mass of the polyfunctional (meth)acrylate having a bisphenol A structure, based on 100% by mass of the sum total of the amount of the polyfunctional (meth)acrylate (a1) and the amount of the acrylamide compound (a2) having at least one hydroxyl group per molecule.

4. An article comprising a hard coat formed from the coating material according to claim 1.

5. A decorative sheet comprising a hard coat formed from the coating material according to claim 1.

6. An article comprising the decorative sheet according to claim 5.

* * * * *